W. W. BARBER.

DUST PROTECTOR FOR THE ATTENDANTS OF THRASHING MACHINES.

No. 10,724. Reissued May 18, 1886.

Witnesses

M. E. Fowler

W. F. Barnhart

Inventor

William W. Barber.

By his Attorneys

C. A. Snow & Co.

N. PETERS, Photo-Lithographer, Washington, D. C.

UNITED STATES PATENT OFFICE.

WILLIAM WALLACE BARBER, OF RUTHVEN, IOWA.

DUST-PROTECTOR FOR THE ATTENDANTS OF THRASHING-MACHINES.

SPECIFICATION forming part of Reissued Letters Patent No. 10,724, dated May 18, 1886.

Original No. 332,224, dated December 15, 1885. Application for reissue filed March 12, 1886. Serial No. 195,018.

*To all whom it may concern:*

Be it known that I, WILLIAM WALLACE BARBER, a citizen of the United States, residing at Ruthven, in the county of Palo Alto and State of Iowa, have invented a new and useful Improvement in Dust-Protectors for the Attendants of Thrashing-Machines, of which the following is a specification, reference being had to the accompanying drawings.

My invention has relation to improvements in dust-protectors for the attendants of thrashing-machines; and it consists in the peculiar and novel construction, combination, and arrangement of the various parts for service, substantially as fully set forth, and specifically pointed out in the claim.

It is well known to those skilled in the art and others accustomed to the practical operation or use of thrashing-machines that there is always a cloud of dirt, dust, chaff, and other matter set loose when a machine of this class is in operation, and that the attendant, or, as he is termed, the "feeder," is liable to have his mouth and eyes filled with such loose flying dust and the like, and he is otherwise exposed to the effects of the dust, &c., which is very annoying and injurious.

The object of my invention is to provide an improved device to be applied or secured to a thrashing-machine, by the use of which all dust, dirt, chaff, and other matter are prevented from escaping from the throat or cap of the machine, so that they will not fill the air around the machine, and thus render it very inconvenient and annoying to the attendant or feeder, while at the same time the superfluous dirt, dust, chaff, and other loose matter that ordinarily escape into the surrounding atmosphere will be carried through and discharged from the machine along with the straw or other refuse matter, the cylinder and concave of the machine to which the device is applied being also protected and kept clean of the accumulation or retention of dirt, dust, &c., on the teeth thereof.

Figure 1:
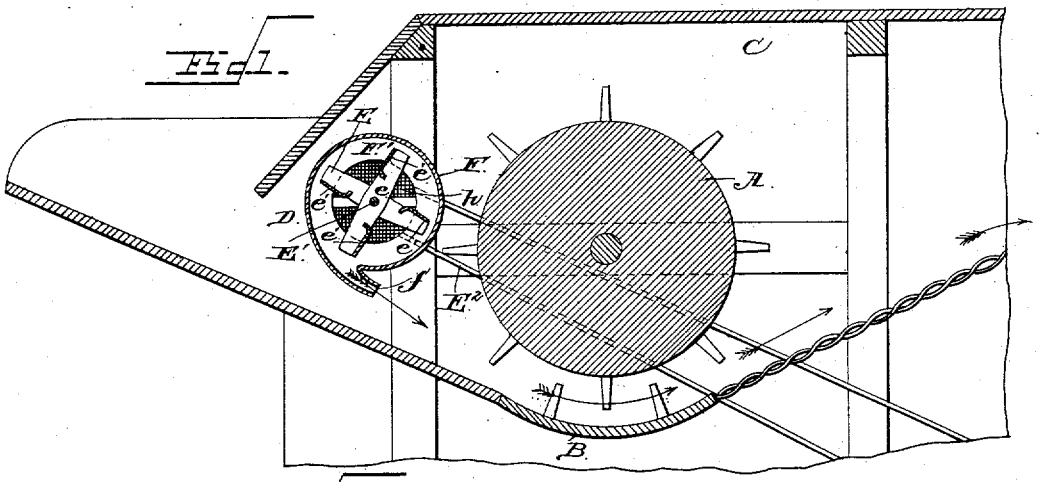
Figure 2:
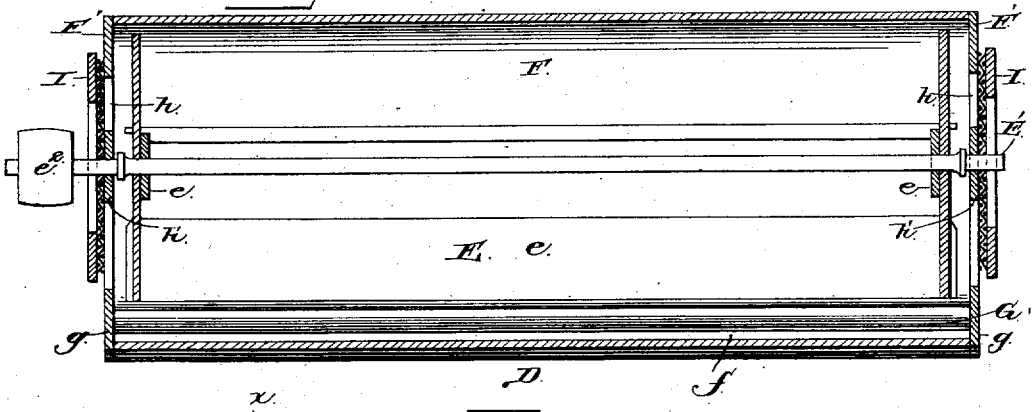
Figure 3:
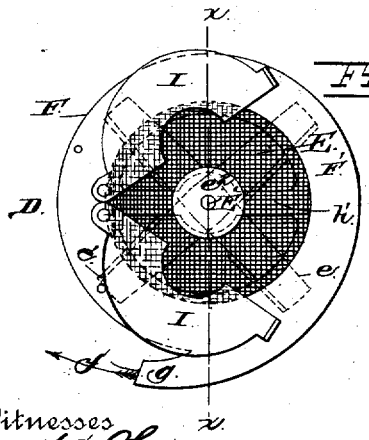
Figure 4:
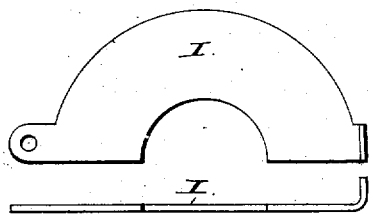

I have shown an embodiment of my invention in the accompanying drawings, in which Figure 1 is a transverse sectional view through the fan, casing, the cylinder, concave, and their supporting-frame of an ordinary thrashing-machine. Fig. 2 is a longitudinal section through the fan and casing detached from the thrashing-machine. Fig. 3 is an end elevation, and Fig. 4 is a detail view, of the wind-boards for regulating the supply of air to the fan.

Like letters of reference in the several drawings denote corresponding parts.

Referring by letter to the drawings, A designates the cylinder, B the concave, and C the casing or supporting-frame, of so much of a thrashing or clover-hulling machine as is necessary for a clear and proper understanding of my invention. These parts may be of any ordinary or preferred construction, my invention being applicable to machines of any description falling within the range of the classes above enumerated.

D designates my improvement, which is arranged within the cylinder-cap of the machine, and which comprises, essentially, a revolving fan and a casing arranged in front of the cylinder out of and above the path of travel of the grain to be fed thereto, and adapted to discharge or force a blast or current of air onto the incoming grain and between the cylinder and concave. The fan and case E F respectively are arranged transversely across from side to side of the frame C of the thrashing-machine and longitudinally with the cylinder A. The fan E comprises a shaft, E′, journaled in proper supports of the cylinder-head, two or more cross-bars arranged near each end thereof, as at *e*, which bars are tapered or reduced toward each end, as shown, and a series of longitudinal bars, *e′*, connecting the cross-bars *e* at each end near their outer extremities, the shaft E′ having a driving-pulley, $e^2$, rigidly secured or keyed thereon, and driven by a belt, $E^2$, communicating motion thereto from any operative part of the machine. The fan-case F comprises a cylindrical shell having heads F′, to which said shell is secured in any suitable or preferable manner, and said shell is further provided with a contracted discharge-opening, *f*, at its lower forward surface, with which discharge-opening communicates the chamber of a discharge-throat, G, which comprises an upper and lower wall, which converge toward each other and are connected at their ends by vertical walls *g*, as clearly shown. The contracted discharge-throat of the fan-casing is arranged out of or above the plane of travel or motion of the grain to be fed to the cylinder and on the plane with or a little above the upper surface of the grain, and the fan is adapted to direct a blast or current of air of sufficient strength upon the surface of the grain and between the cylinder and concave to force the dust, dirt, or other impurities out through the opening in the machine-frame through which the refuse straw is passed. The cylinder-heads F′ are each secured by means of bolts and nuts to the side walls of the machine-frame in the relative position to the cylinder and concave thereof as described, or by any other preferable means. Openings or ports *h* are made in each cylinder-head, which are adapted to coincide with openings in the cylinder-cap of the machine-frame, to permit a proper supply of air to the fan and casing. The fan-shaft E′ projects beyond the cylinder-heads and the machine-frame, and is journaled or supported in cross-bars *h*′, arranged transversely across the openings *h*, and suitably secured thereto in any preferable manner. The air ports or openings *h* are each covered or protected by a screen of wire or other material, which is secured thereto in any preferable manner, to prevent and exclude dirt, dust, and other impurities in the supply of air from entering the fan-casing and being fed between the cylinder and concave.

I I designate regulating-boards for regulating the supply of air fed to the fan-casing or cylinder. Said regulating-boards are arranged in pairs at each end of the fan-casing, and are pivoted at one end thereof to said cylinder-heads, so that they can be thrown wide open, or partially so, and independently of each other on opposite sides of the fan-shaft, as is obvious.

It will be observed from the foregoing description, taken in connection with the drawings, that I provide an improved device for a thrashing-machine, whereby dirt, dust, chaff, and other loose matter are prevented from escaping into the surrounding air from the cylinder cap or throat of the machine, so that they will not annoy or injure the attendant or feeder, and, further, that such dirt, dust, &c., will be blown rearwardly through and out of the machine along with the chaff, straw, and other refuse matter, and also that the cylinder and concave will be kept free from the accumulation of dust, &c., thereon.

My improved device can be very readily applied for use upon a thrashing-machine of any class that employs a cylinder and concave with beneficial and advantageous results, and the improvements are very simple, strong, and durable in construction, thoroughly effective and reliable in operation, and comparatively cheap and inexpensive of manufacture.

I do not desire to limit myself to the exact details of construction and form and proportion of parts herein shown and described, as I am aware that many changes therein can be made without departing from the principle of my invention.

Having thus fully described my invention, what I claim as new, and desire to secure by Letters Patent, is—

A dust-protector for the attendants of thrashing-machines, comprising a fan arranged longitudinally and in front of the cylinder and concave, a casing inclosing said fan and provided with a discharge-throat arranged out of the plane of motion of the grain fed to the cylinder and concave, and with the screened air-ports in its heads, and the wind-regulating boards for closing the ports and varying the quantity of air admitted into the fan-casing, substantially as described.

In testimony that I claim the foregoing as my own I have hereto affixed my signature in presence of two witnesses.

WILLIAM WALLACE BARBER.

Witnesses:

OLE S. OLSON,

L. G. WOOLLISCROFT.